United States Patent [19]

Umeda

[11] 4,092,684
[45] May 30, 1978

[54] AUTOMATIC LOADING VIDEO RECORDER WITH SPEED STABILIZING

[75] Inventor: Hiroyuki Umeda, Yokohama, Japan

[73] Assignee: Victor Company of Japan, Ltd., Yokohama, Japan

[21] Appl. No.: 771,256

[22] Filed: Feb. 23, 1977

[30] Foreign Application Priority Data
Feb. 25, 1976 Japan .................................. 51-19563

[51] Int. Cl.² ............................................. G11B 15/66
[52] U.S. Cl. ....................................... 360/85; 242/198
[58] Field of Search ........................... 360/85; 242/198

[56] References Cited
U.S. PATENT DOCUMENTS

| | | | |
|---|---|---|---|
| 3,821,805 | 6/1974 | Serizawa | 360/85 |
| 3,969,766 | 7/1976 | Tanaka et al. | 360/85 |

*Primary Examiner*—Robert S. Tupper

[57] ABSTRACT

A video signal recording and/or reproducing apparatus comprises a guide drum having at least one rotating head for recording and/or reproducing video signals. Tape is drawn from within a cassette and loaded into a specific tape travel path including a part wherein the tape is in wrapping contact with a part of the guide drum. At least one impedance roller contacts the tape loaded in the predetermined tape travel path. The impedance roller is in the vicinity of a position where a loading means completes the loading.

6 Claims, 10 Drawing Figures

AUTOMATIC LOADING VIDEO RECORDER WITH SPEED STABILIZING

BACKGROUND OF THE INVENTION

The present invention relates generally to video signal recording and/or reproducing apparatus, and more particularly to a video signal recording and/or reproducing apparatus in which a recording tape is drawn from a cassette and loaded into a specific tape travel path, through which it may travel stably.

In general, video signal recording and/or reproducing apparatus, particularly those for use in homes, are being miniaturized. For this reason, the tape travel paths are becoming shorter, but is no charge in their complexity of such apparatus. One result is an increase of the wrapping angles of the tape around the tape guide members. This increased angle gives rise to fluctuations in tape travel. For this reason, stabilization of the tape travel is particularly desired, especially in a miniaturized video signal recording and/or reproducing apparatus.

Furthermore, there is a demand for a lengthening of the recording and reproducing time for a predetermined tape quantity. In view of this demand, a system was designed which is shown and described in U.S. patent application Ser. No. 731,935, entitled "COLOR VIDEO SIGNAL RECORDING AND REPRODUCING SYSTEM", filed Oct. 13, 1976. This system has a tape travel speed which is lowered to approximately one half the conventional speed and which has succeeded in achieving good recording and reproducing of video signals. However, as the tape travel speed becomes lower, the effect of tape travel fluctuation becomes greater.

When there is a fluctuation in the tape travel speed, jitter appears in the reproduced picture, which causes the picture to become poor. Accordingly, there is a particular requirement for stabilization of the tape travel in a video signal recording and/or reproducing apparatus which has been miniaturized and in which, the tape travels at slower speeds.

SUMMARY OF THE INVENTION

Accordingly, it is a general object of the present invention to provide a novel and useful video signal recording and/or reproducing apparatus which satisfies the above stated requirements.

Another and specific object of the invention is to provide a video signal recording and/or reproducing apparatus having impedance rollers for making contact with the tape in its travel path. By this provision, the tape travels in a stable manner even when it is traveling through a complicated tape travel path, at a low travel speed.

Still another object of the invention is to provide a video signal recording and/or reproducing apparatus having impedance rollers for stabilizing the tape travel. These impedance rollers are adapted so that they do not interfere with the operation of the loading means for drawing the tape from the cassette and loading it into the predetermined tape travel path. Yet the impedance rollers make contact the tape thus loaded.

Other objects and further features of the present invention will be apparent from the following detailed description set forth in conjunction with the accompanying drawings.

DETAILED DESCRIPTION

Figure 1:
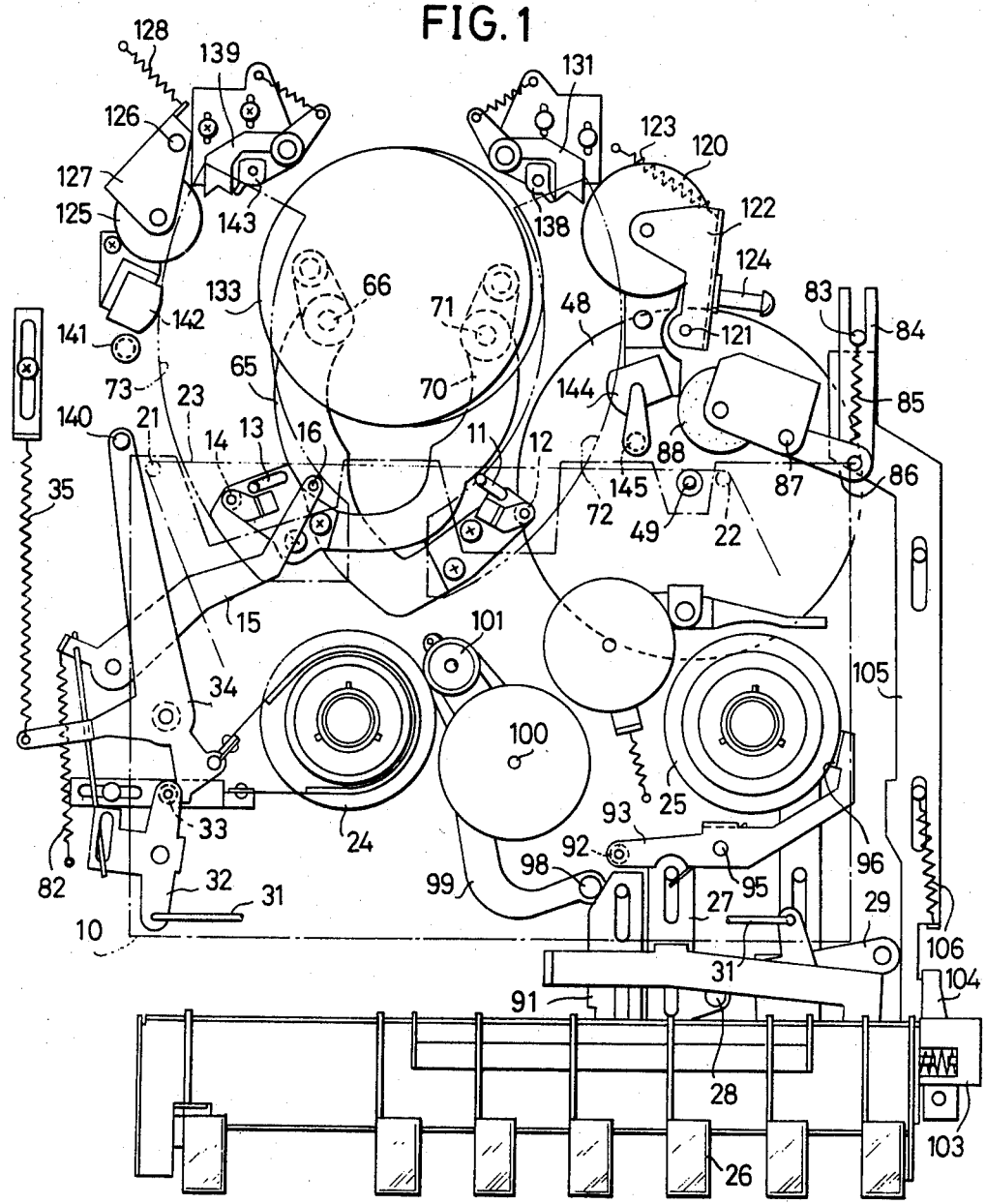
FIG. 1 is a plan view showing a first embodiment of a video signal recording and/or reproducing apparatus according to the present invention.

For recording or reproducing, a cassette (cartridge) 10 is placed in a loading position in the recording/reproducing apparatus, as indicated by two-dot chain line in FIG. 1. Guide poles 11 and 13, guide rollers 12 and 14, a tension pole 16 on a tension arm 15, and a capstan 27 respectively enter an opening in the bottom of the cassette 10 and fit into the interior thereof. These members are disposed on the inner side of the tape, that is, on the non-magnetic side of the tape. A magnetic tape guide poles 20, 21, and 22 guide tape 23 in its span between a tape supply roll 18 and a take-up roll 19. The magnetic surface of the tape face, the front of the cassette 10.

When the cassette 10 is placed in its operational position, a supply reel and a take-up reel (neither being shown) respectively fit onto a supply side reel disc 24 and a take-up side reel disc 25 contained within cassette 10. The tape rolls 18 and 10 are respectively wound on the reels. . When a PLAY button 26 is pushed, a lever 27 and its actuator pin 28 slide in the arrow direction A, to rotate a lever 29 in the clockwise direction about a shaft 30. As one result of this rotation of the lever 29, a lever 32 is rotated in the counterclockwise direction by a rod 31, whereby a lever 31 is released from its engagement with a pin 33 and is thereby rotated in the clockwise direction responsive to the tension of a spring 35. As another result of the rotation of the lever 29 rod 36 turns, a lever 37 in the clockwise direction about a shaft 38. As the lever 37 turns clockwise, a pin 40 fixed on a lever 39 is released from its engagement with the lever 37, whereby the lever 39 rotates in the counter clockwise direction about a shaft 42 as a result of the tension force of a spring 41, whereupon an eccentric gear 43 on the lever 39 meshes with a gear 44.

As a result of the pushing of the PLAY button 26, a switch (not shown) is closed to start a motor 45, whereby a rotating shaft 46 rotates in the clockwise direction. The rotation of this shaft 46 is transmitted through a belt 47 to a fly-wheel 48, whereupon a capstan 49 rotates. Further, the rotation of the capstan 49 is transmitted by way of gears 50 and 51 to the gear 44, which is thereby rotated in the clockwise direction at a reduced rotational speed.

Figure 3:
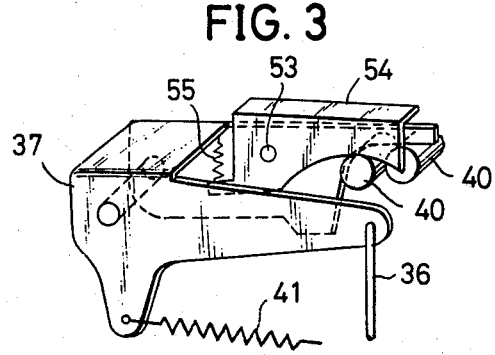
FIG. 3 is a perspective view showing mechanical elements constituting a portion of the parts shown in FIG. 2.

The eccentric gear 43, which has meshed with the gear 44, is rotated counterclockwise about a shaft 52 responsive to a rotation of the gear 44. Interrelatedly with the rotation of the eccentric gear 43, the lever 39 rotates in the clockwise direction, counter to the force of the spring 41. The pin 40 also moves in the clockwise direction as lever 39 turns. A stop member 54 is rotatably supported on the lever 37 by a shaft 53, as clearly indicated in FIG. 3. Stop member 54 is turned counterclockwise by the pin 40, with movement counter to the force of a spring 55. When the eccentric gear 45 rotates to a position which is slightly short of the rotational position where its maximum radius pat meshes with the gear 44, the pin 40 passes beyond the distal end of the stop member 54. Consequently, the stop member 54 is turned to the original position by the force of the spring 55 and thereby prevents the shift of the pin 40 in the counterclockwise direction.

At a part where it meshes with gear 44, the radius of the eccentric gear 43 begins to decrease as the eccentric gear 43 rotates further. The eccentric gear 43 is separated from the gear 44 because the lever 39 has already been restricted in its counterclockwise rotation by the pin 40 and the stop member 54. arrow The turning of the lever 39 in the clockwise direction (FIG. 4) causes levers 60 and 61, engaged with the lever 39 at its distal end, to slide respectively in the arrow direction B. As a result of this sliding movement of the lever 60, a lever 62 turns clockwise about a shaft 63, and a lever 64 moves in the arrow direction G. Consequently, a rotatable lever 65 supporting pole 11 and roller 12, at its distal end, turns in the counterclockwise direction about the shaft 66. Moreover, as a result of the sliding movement of the lever 61, a lever 67 turns counterclockwise about a shaft 68. Lever 69 moves in the arros direction D. Consequently, a rotatable lever 70 having pole 13 and roller 14, at a distal end, turns in a clockwise direction about a shaft 71.

Figure 5:
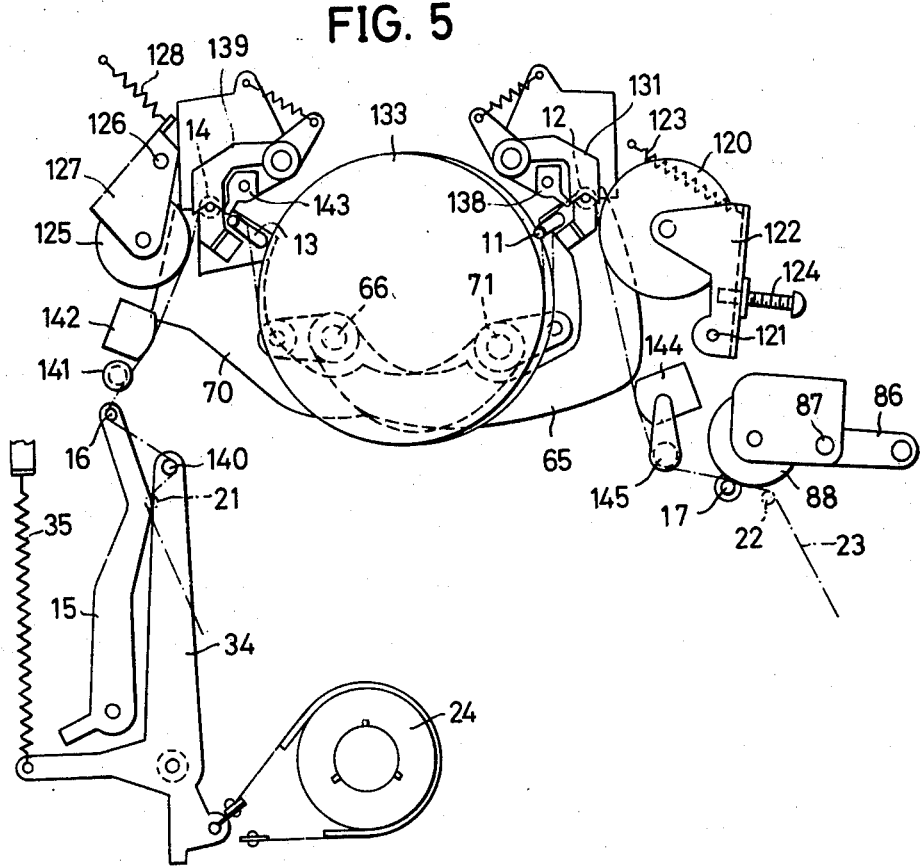
FIG. 5 is a plan view showing a essential part of an apparatus, according to the present invention, in a state which occurs after the tape loading has been completed.

Interrelatedly with rotation of the levers 65 and 70, the guide poles 11 and 13 with the guide rollers 12 and 14 intercept the magnetic tape 23 and draw it out of the cassette 10 through an opening at its front surface. The tape 23 moves along slots 72 and 73 (shown by a two-dot chain line) formed in the chassis until it reaches a specific position as indicated in FIG. 5.

The shafts 63 and 68 are respectively provided on levers 75 and 78, which are pivoted respectively on pins 74 and 75 and limited in the range of their rotations by stop members 76 and 79. A spring 80 is stretched between the levers 75 and 78. This mechanism absorbs the movement of the levers 60 and 61 to prevent the levers 65 and 70 from moving excessively.

Figure 2:
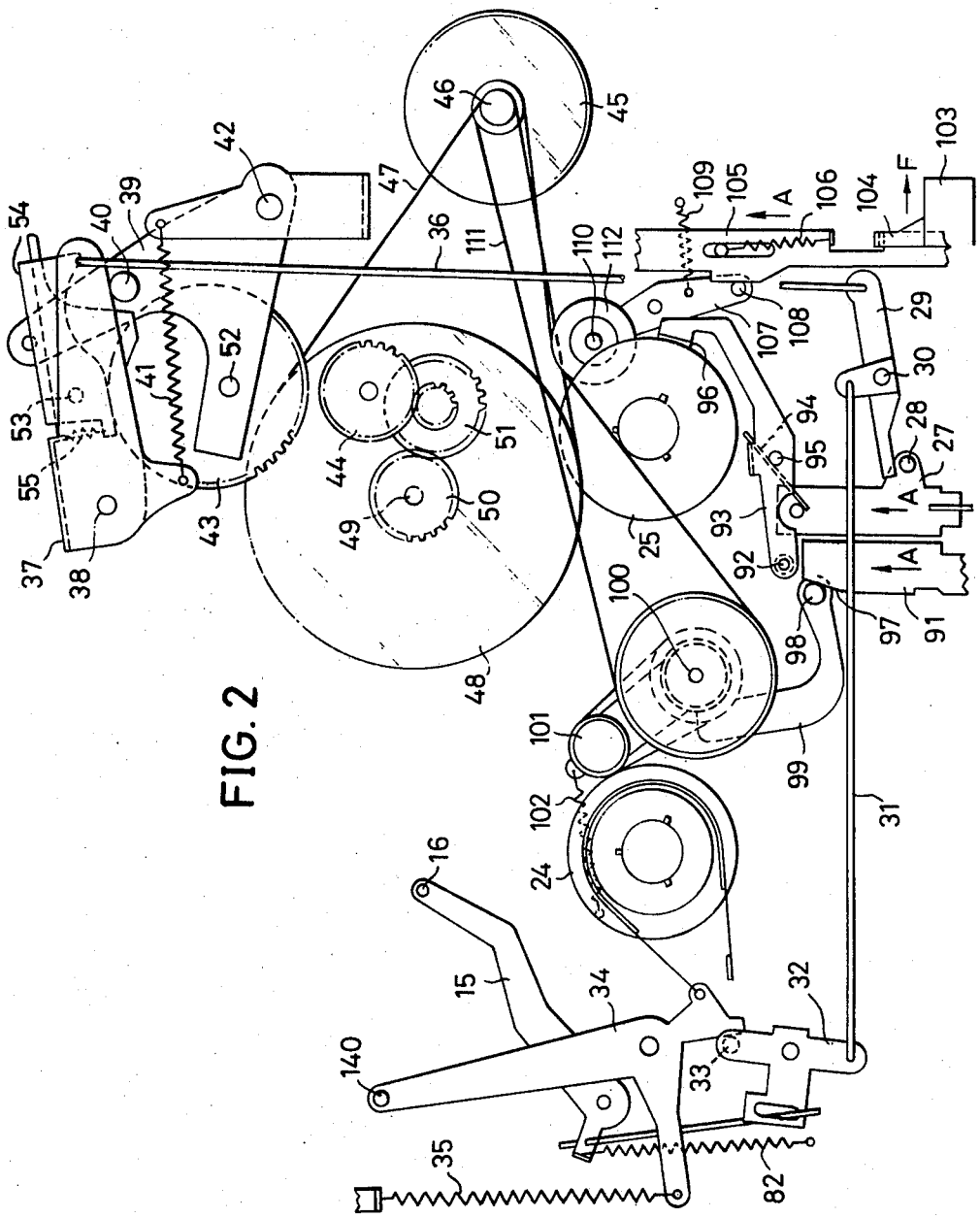
FIG. 2 is a plan view showing the mechanical parts which operate in response to the manipulation of a PLAY lever.

As a result of the rotation of the lever 70, the lever 15 (FIG. 2) is released from its locked state since a stepped part 81 of the lever 15, is turned counterclockwise by the force of a spring 82. As a consequence, the guide pole 16 defines the tape travel path.

Figure 4:
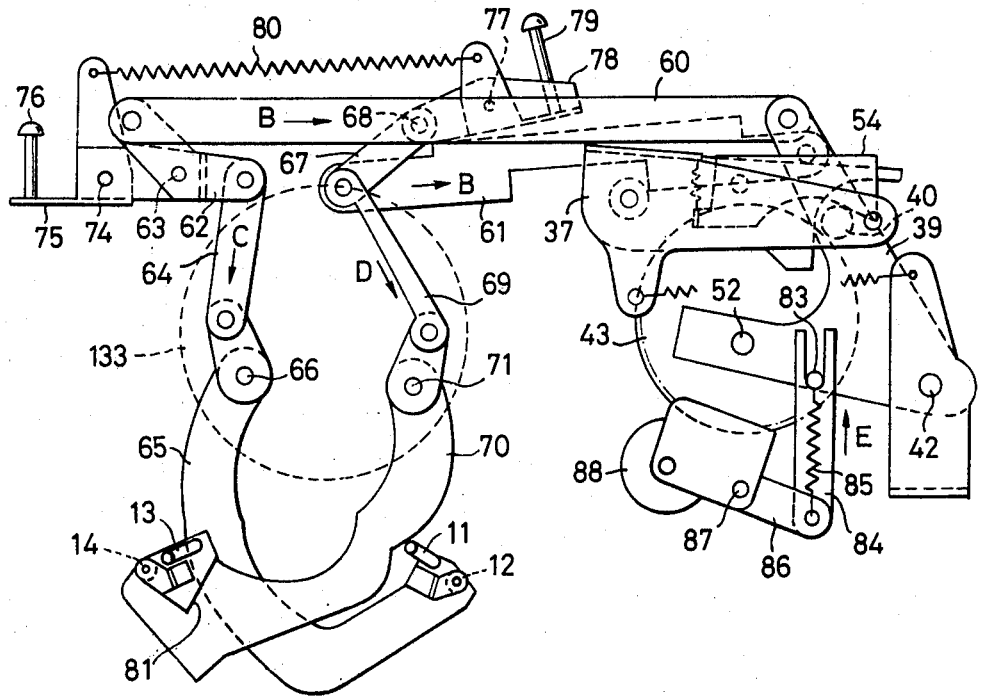
FIG. 4 is a plan view showing the mechanical parts for driving a tape loading means.

Referring to FIG. 4, as a result of the clockwise rotation of the lever 39, a pin 83 fixed thereto also moves a lever 84 in the arrow direction E by the force of a spring 85. As a consequence, a lever 86 rotates in the counterclockwise direction about a pin 87, and a pinch roller 88 presses against the capstan 17, over the tape 23.

Referring again to FIG. 2, when the PLAY button 26 is pressed, movement is transmitted through an intercoupling mechanism to cause a lever 91 to slide in the arrow direction A. The leading end of this lever 91 pushes against a pin 92 fixed to a lever 93, which thereupon rotates clockwise about a pin 95 counter to the force of a spring 94. As a consequence a brake shoe 96 separates from the reel support disc 25, which releases a brake on disc 25. As another result of the sliding of lever 91, an inclined part 97 pushes a pin fixed in the distal end of a lever 99, which rotates clockwise about a shaft 100. This rotation causes a roller 101 to separate from the reel support disc 24 counter to the force of a spring 102, thereby releasing a brake for the reel disc 24.

As still another result of the pressing of the PLAY button 26, movement is transmitted through an intercoupling mechanism to cause a lever 103 to slide in the arrow direction F. A lever 105 is released from its locked state due to a lock lever 104. The lever 105 is, therefore, forced by a spring 106 to slide in the arrow direction A. Lever 105 releases a pin 108 fixed to a lever 107, from its locked state. The lever 107 is turned counterclockwise by the force of a spring 109. As a consequence, a roller 110 is pressed into contact with the reel disc 25. This roller is being drive in rotation by the motor 45 acting through a belt 111 and a pulley 112. Consequently, the reel disc 25 is turned by roller 110 in a clockwise direction to drive the takeup reel and wind up the tape.

The essential parts of the apparatus of the present invention will now be described in conjunction with FIG. 5. An impedance roller 120 is rotatably supported by a plate 122 pivoted on a pin 121. The plate 122 is urged to rotate in the counterclockwise direction by a spring 123, but it is limited in this rotation at the position indicated in FIG. 5 by a stop mechanism 124, in the form of an adjusting screw 124. Another impedance roller 125 is rotatably supported on a plate 127 pivoted on a pin 126. The plate 127 is urged to rotate in the counterclockwise direction by a spring 128, but it is limited in this rotation at the position indicated in FIG. 5. The impedance rollers 120 and 125, shown in FIG. 5, have entered into the paths of movement of the guide rollers 12 and 14.

As the levers 65 and 70 rotate, the pole 11 and roller 12 and the pole 13 and roller 14 move within the slots 72 and 73 while engaging the tape 23. As they approach the end of this movement, the rollers 12 and 14 are pressed into contact against the impedance rollers 120 and 125 and move further to push these rollers aside. The impedance rollers 120 and 125 are thus pushed by the rollers 12 and 14. The plates 122 and 127 respectively rotate temporarily in the clockwise direction but, as the rollers 12 and 14 pass by, these plates are again returned to their original positions by the forces of the springs 123 and 128.

Figure 6:
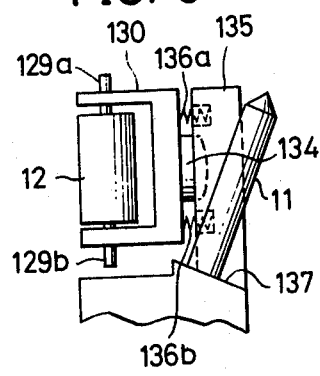
FIG. 6 is an elevation showing a loading pole and a guide pole.
Figure 7:
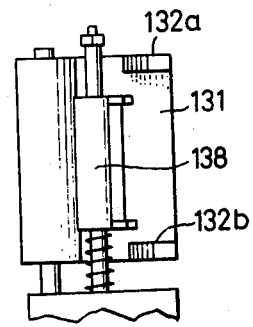
FIG. 7 is an elevation showing a stop member.

The roller 12 has shaft parts 129a and 129b projecting upwardly and downwardly through a bracket 130 as shown in FIG. 6. These shaft parts strike against and are engaged by stop parts 132a and 132b of a stop member 131. Thus, the roller 12 is stopped in its movement at this position. The roller 14 and a stop member 133 have a construction and interrelation similar to those of the roller 12 and the stop member 131. The the roller 14 is also stopped by the stop member 139. With these mechanisms in this state, the automatic loading of the tape 23 into its predetermined tape travel path is completed. The tape 23 is wrapped around the cylindrical surface of a guide drum 133 having rotating video heads (not shown), over a predetermined angular distance defined by the poles 11 and 13.

The bracket 130 is supported to enable an up-and-down rotation through a projection 134, by a support structure 135 as shown in FIG. 6. Furthermore, springs 136a and 136b are interposed between the bracket 130 and the support structure 135. The pole 11 is fixed at its root part to an inclined base 137 which is integral with the support structure 135 on the end of the lever 65. The pole 13 and the roller 13 are also of similar construction. Since the orientation of the tape is changed by a mechanism comprising inclined poles and up-right rollers, there is no need for using conical guide poles, whereby the production, installation, and adjustments are facilitated.

Upon completion of the automatic tape loding, the tape 23 is drawn from the tape roll 18 on the tape-supply side past tension poles 140 and 16, a guide pole 141, and a full-width erasing head 142. Thereafter, it comes into contact with the above described impedance roller 125. The tape 23 is further guided and changed in direction by the guide pole 14, a guide 143 for determining tape position, and the guide pole 13. The tape held is in a wrapping helical around the guide drum 133. While the tape 23 is thus in wrapping contact, a video signal is recorded therefrom or reproduced therefrom by the rotating video heads within the drum 133

After leaving the guide drum 133, the tape 23 is guided and changed in direction by the guide pole 11, a guide 138 for fixing the tape position, and the guide pole 12. After contacting the impedance roller 120, the tape 23 contacts a recording and reproducing head 144 for audio and control signals and a guide pole 145. The tape 23 thereafter is clamped between and driven by the pinch roller 88 and the capstan 17. Then, it enters the cassette 10 and is wound on the tape roll 19. The guide drum 133 is inclined at a specific angle relative to the chassis. The path of the tape, while in wrapping contact with the cylindrical surface of the guide drum, is parallel to the chassis. Therefore, the path of the tape is of helical form relative to the rotating surface of the rotating heads of the guide drum 133.

The impedance rollers 120 and 125 are provided at positions which are as close as possible to the guide drum 133, that is, at positions in the vicinity of the guide rollers 12 and 14.

As the tape 23 travels through the tape travel path, very minute fluctuations in the tape speed are suppressed by the inertial rotation of the impedance rollers 125 and 120, whereby the tape travel is held remarkably stable.

It is to be observed that the positions of plate 122 and the impedance roller 120 can be by adjusting the adjusting screw of the stop device 124. By this adjustment, it is possible to adjust the position of the tape 23 contacting the impedance roller 120 and to adjust the length of the tape travel path between the guide drum 133 and the audio and control signal recording and reproducing head 144. By this adjusting procedure, the tape travel path length can be set at an optimum value corespond-ing to the relative positions of the audio and the control signal on the tape. Therefore, a tape which has been recorded in one apparatus can be reproduced in another apparatus, with excellent reproduction achieved by making the above described adjustments. A high degree of interchangeability is afforded.

Figure 8:
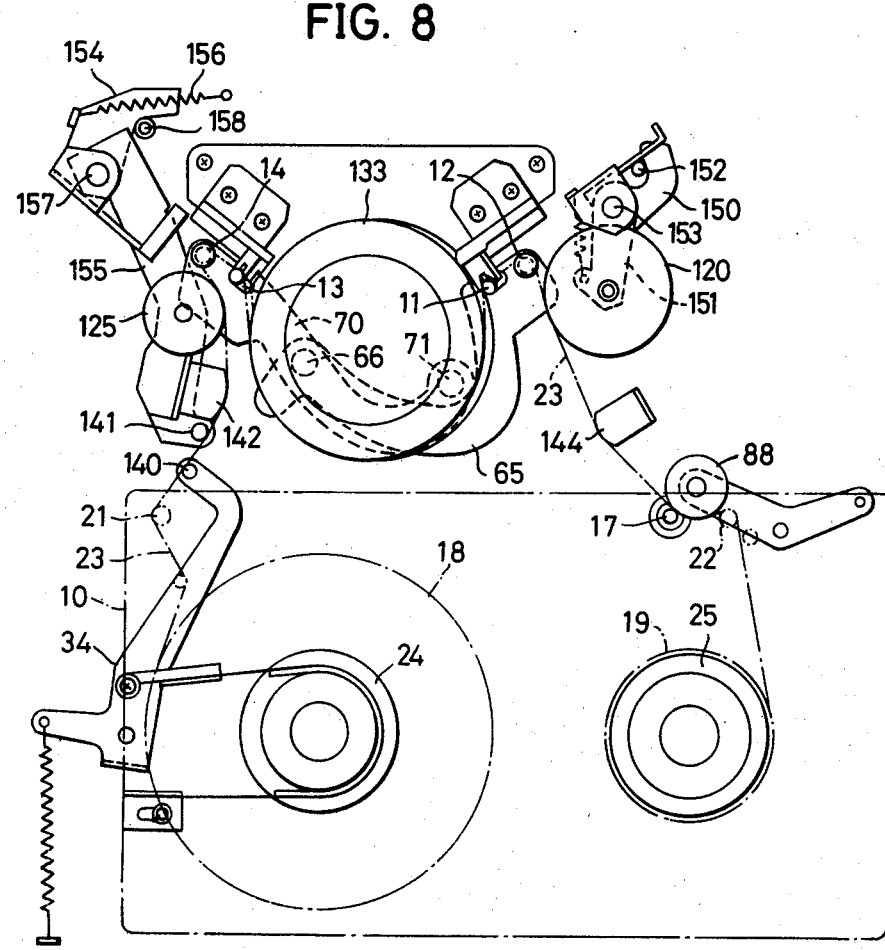
FIG. 8 is a plan view showing a second embodiment of a video signal recording and/or reproducing apparatus according to the present invention, in a state which occurs after the tape loading has been completed.
Figure 9:
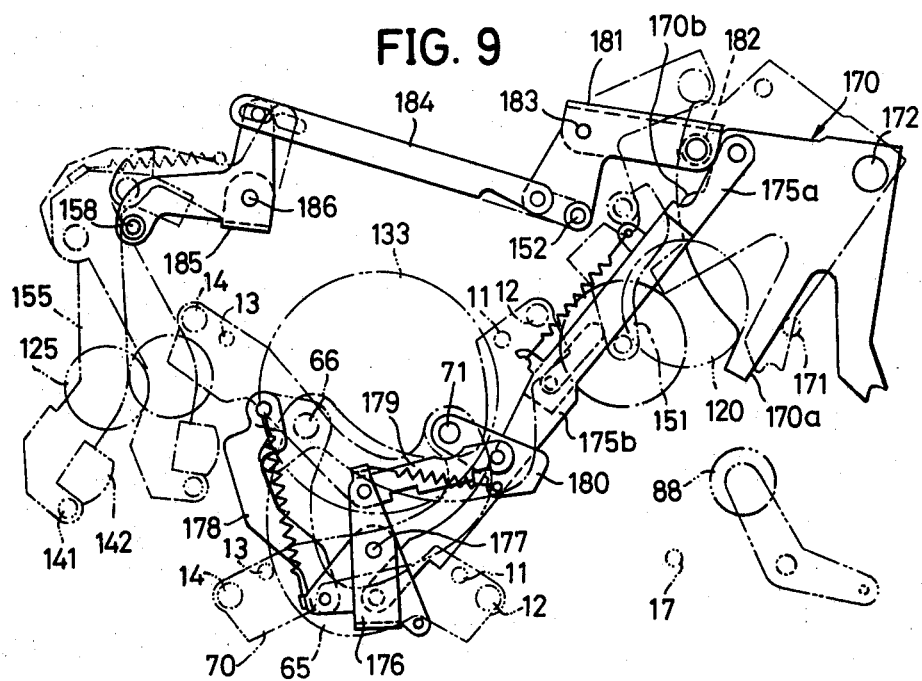
FIG. 9 is a plan view showing a tape loading mechanism and an impedance roller shifting mechanism in the apparatus shown in FIG. 8.
Figure 10:
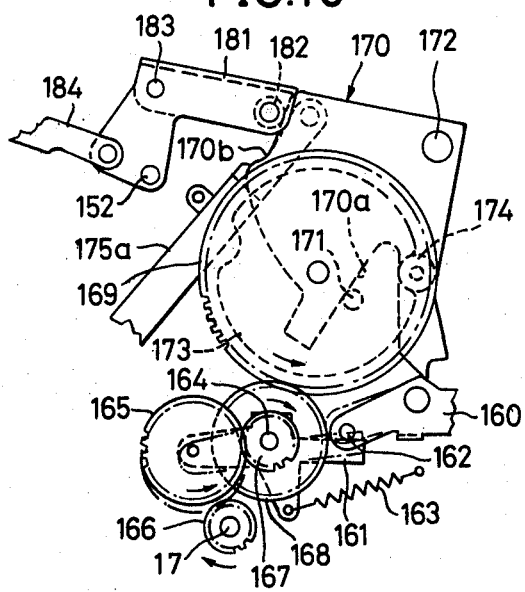
FIG. 10 is a plan view showing the mechanical parts for driving the mechanism shown in FIG. 9.

Next, a second embodiment of a video signal recording and/or reproducing apparatus according to the present invention will be described in conjunction with FIGS. 8, 9 and 10. Parts in FIGS. 8 through 10 which are the same as corresponding parts in FIGS. 1 through 7 are designated by like reference numerals, and a detailed description of them will not be repeated.

The impedance roller 120 is rotatably supported on a support arm 151 which is mounted on a common shaft with an associated actuating arm 150. When the apparatus is in the stopped mode, the actuating arm 150, with its cam part engaged by a roller 152, is rotated about a shaft 153 to a position indicated by a two-dot chain line in FIG. 9. The impedance roller 120 is, therefore, retracted to a position outside of the moving paths of the guide pole 11 and guide roller 12, during the loading mode.

The other impedance roller 125 is rotatably supported on a support arm 155 which is mounted on a common shaft with an associated actuating arm 154. In the stopped mode , the actuating arm 154 is rotated about a shaft 157 responsive to the force of a coil spring 156, to a position indicated by two-dot chain line in FIG. 9. The impedance roller 125 is also retracted to a position which is outside the moving paths of the guide pole 13 and guide roller 14, during the loading mode. The full-width erasing head 142 and the guide pole 141 are mounted on the outboard end of actuating arm 154. The cam part of arm 154 is in contact with a roller 158.

When the PLAY button is pressed, this a movement is transmitted through an intercoupling mechanism to rotate a lever 160 (FIG. 10) in the clockwise direction. A lever 161 is released from its locked state when a pin 162 on the lever 160 is moved away while lever 160 is rotated counterclockwise about a shaft 164 responsive to the force of a spring 163. This causes a gear 165, rotatably supported on the distal end of the lever 160, to mesh with a gear 166 mounted coaxially with the capstan 17. As a consequence, the rotation of the gear 166 is transmitted by way of the gear 165 and gears 167 and 168 to a gear 169.

As the gear 169 rotates counterclockwise, a cam structure 170 of approximately fan shape is compulsorily rotated clockwise with respect to a shaft 172. Its surface 170a is guided by an actuating pin 171 fixed at its root part to the lower surface of the gear 169. When the gear has rotated through approximately one half revolution, it is locked by the action of a circular cam structure 173 and a roller 174. At the same time, the lever 160 rotates, and the gear 158 separates from the gear 159. Furthermore, the cam structure 170 reaches its final rotational position as indicated by single-dot chain line in FIG. 9.

Together with the rotation of the cam structure 170 up to the vicinity of the final rotational position, a rotating lever 176 is rotated clockwise about a shaft 177 by a pair of coupling levers 175a and 175b connected by a spring. In addition, the rotating levers 65 and 70 rotate respectively counterclockwise and clockwise by coupling levers 178 and 179 and an arm 180, to positions indicated by single-dot chain line in FIG. 9, that is, the positions indicated in FIG. 8. As a consequence of this action, tape loading is substantially the same as in the aforedescribed embodiment of the invention. During this tape loading operation, the impedance rollers 120 and 125 are still in their retracted positions. The guide rollers 12 and 14 move smoothly without colliding with the impedance rollers 120 and 125.

When the cam structure 170 rotates further to its terminal position, a roller 182 supported on an L-shaped arm 181 is guided by an inclined cam surface 170b of the cam structure 170. The arm 181 rotates counterclockwise about a pin 183. This rotation of the arm 181 is transmitted through a coupling arm 184 to cause another L-shaped arm 185 to rotate clockwise about a pin 186. The rollers 152 and 158 are respectively provided on these L-shaped arms 181 and 185.

As a result of the rotation of the L-shaped arm 181, the actuating arm 150 is engaged and guided by the roller 152 and rotates clockwise. The impedance roller 120 contacts the tape 23 in the vicinity of the outlet side, with respect to the guide drum 133, as viewed in the direction of tape travel. Furthermore, as a result of the rotation of the other L-shaped arm 185, the actuating arm 154 is engaged and guided by the roller 158. Arm 154 rotates counterclockwise against the force of the spring 156. The impedance roller 125 contacts the tape 23 in the vicinity of the inlet side, with respect to the guide drum 133 as viewed in the tape travel direction.

When the STOP button is manipulated during the reproducing mode of operation, the gear 169 rotates through approximately one half revolution similar as to the time when the PLAY button is pressed. The cam structure 170 rotates counterclockwise to its position indicated by full line in FIG. 9. As a result of the return action of the cam structure 170, the impedance rollers 120 and 125 initially return to their original retracted positions. Then, the guide poles 11 and 13 and the guide rollers 12 and 14 move, in the direction opposite to the direction of movement at the time of tape loading, without colliding with the impedance rollers 120 and 125. They return to their original positions indicated by a two-dot chain line in FIG. 9.

Further, this invention is not limited to these embodiment. Various modifications may be made without departing from the scope and spirit of the invention.

What is claimed is:

1. A video signal recording and/or reproducing apparatus comprising:
   a guide drum having at least one rotating head for recording and/or reproducing video signals;
   loading means for drawing out a tape accommodated within a cassette and loading said tape in a specific tape travel path including a part wherein the tape is in wrapping contact with a predetermined arcuate portion of said guide drum; and
   at least one impedance roller having a peripheral portion making contact with the tape thus loaded in said predetermined tape travel path and rotating with a peripheral speed equal to a travel speed of the tape in said predetermined tape travel path, thereby stabilizing the travel speed of the tape responsive to a rotational inertia of the impedance roller.

2. A video signal recording and/or reproducing apparatus as claimed in claim 1 and means for moving said impedance roller into the vicinity of said loading means responsive to a completion of the loading operation.

3. A video signal recording and/or reproducing apparatus as claimed in claim 1 which further comprises: holding means for holding said impedance roller in a freely rotatable manner, means for displacing the impedance roller between a tape-contacting position in the predetermined tape travel path and a retracted non-tape-contacting position; and biasing means for urging said holding means in a direction of movement away from said retracted position and toward said contacting position, and means responsive to a tape loading operation for temporarily retracting said impedance roller so that it does not interfere with the loading operation of said loading means.

4. A video signal recording and/or reproducing apparatus as claimed in claim 1 which further comprises: means for adjusting the position at which said impedance roller contacts the tape; and a control head for recording or reproducing a control signal on or from the tape, said impedance roller being located in said predetermined tape travel path at a position between said guide drum and said control head.

5. A video signal recording and/or reproducing apparatus comprising:
   a guide drum having at least one rotating head for recording and/or reproducing video signals;
   loading means having a pair of tape loading and guiding means for drawing a tape from a cassette accommoating a supply-side tape roll and a takeup-side tape roll, loading the tape in a predetermined tape travel path wrappingly contacting a predetermined arcuate portion of the surface of said guide drum, and guiding the tape after loading;
   erasing head means operative during recording and located in said tape travel path between one of said tap loading and guiding means and said supply-side tape roll for erasing previously recorded signals, prior to a recording of the video signals;
   tape driving means in said tape travel path between the other tape loading and guiding means and said takeup-side tape roll for driving the tape along said tape travel path;
   control head means for recording and/or reproducing control signals on or from said tape while in said travel path between said other tape loading and guiding means and said tape driving means; and
   first and second impedance roller means having peripheral portions making contact with the tape loaded in said predetermined tape travel path and rotating with a peripheral speed equal to a travel speed of the tape in said predetermined tape travel path for stabilizing the tape travel speed responsive to the rotational inertia of the first and second impedance roller means, the first impedance roller means being located in said tape travel path between said one tape loading and guiding means and said erasing head means, the second impedance roller means being located in said tape travel path between said other tape loading and guiding means and said control head means.

6. A video signal recording and/or reproducing apparatus as claimed in claim 5 which further comprises: holding means for holding said first and second impedance roller means in a freely rotatable manner; means for displacing the impedance roller means between tape contacting positions in said specific tape travel path and retracted positions removed from said tape contacting positions; driving means for causing said holding means to retract said impedance roller means from the path of said loading means during the loading operation and for moving said impedance roller means to said tape contacting positions responsive to a completion of the loading operation.

* * * * *